United States Patent
Chalton et al.

(10) Patent No.: US 11,611,656 B2
(45) Date of Patent: *Mar. 21, 2023

(54) PLATFORM FOR EMERGENCY EVENT SUBSCRIPTIONS

(71) Applicant: RapidDeploy, Inc., Austin, TX (US)

(72) Inventors: Ivor Chalton, Cape Town (ZA); Lidia Finn, Cape Town (ZA); James P. Algatt, Baltimore, MD (US); Ryan Matthew Fouts, Hutto, TX (US); Noam Fein, Austin, TX (US)

(73) Assignee: RapidDeploy, Inc., Austin, TX (US)

(*) Notice: Subject to any disclaimer, the term of this patent is extended or adjusted under 35 U.S.C. 154(b) by 91 days.

This patent is subject to a terminal disclaimer.

(21) Appl. No.: 17/356,883

(22) Filed: Jun. 24, 2021

(65) Prior Publication Data

US 2021/0320998 A1 Oct. 14, 2021

Related U.S. Application Data

(63) Continuation of application No. 17/149,497, filed on Jan. 14, 2021, now Pat. No. 11,070,670.

(60) Provisional application No. 62/961,799, filed on Jan. 16, 2020.

(51) Int. Cl.
*H04M 3/51* (2006.01)
*G06Q 50/26* (2012.01)

(52) U.S. Cl.
CPC ........ *H04M 3/5116* (2013.01); *G06Q 50/265* (2013.01)

(58) Field of Classification Search
CPC .......................... H04M 3/5116; G06Q 50/265

USPC ........................................................ 379/39
See application file for complete search history.

(56) References Cited

U.S. PATENT DOCUMENTS

| | | | |
|---|---|---|---|
| 7,701,363 B1 | 4/2010 | Zlojutro | |
| 7,765,294 B2 * | 7/2010 | Edwards | H04M 7/006 709/224 |
| 7,861,252 B2 | 12/2010 | Uszok et al. | |

(Continued)

FOREIGN PATENT DOCUMENTS

| | | | |
|---|---|---|---|
| WO | 2013042891 A1 | 3/2013 | |
| WO | WO-2015120191 A1 * | 8/2015 | ......... H04L 41/0668 |
| WO | WO-2016118979 A2 * | 7/2016 | ........... G06F 16/254 |

OTHER PUBLICATIONS

International Search Report and Written Opinion issued in PCT/US2021/013528 dated Apr. 1, 2021; 22 pages.

*Primary Examiner* — Mahendra R Patel
(74) *Attorney, Agent, or Firm* — Patent Capital Group (57) ABSTRACT

A data subscription system provides emergency event data to receiving systems. The data subscription system includes an event emitter and a distribution module. The event emitter receives event data describing an event in a computer-aided dispatch (CAD) system; the event is related to an emergency call. The event emitter identifies a subscription subscribed to the event based on a tenant identifier identifying a CAD tenant associated with the event, and adds a data message with the event data to a queue for the identified subscription. The distribution module retrieves the data message from the queue, transforms the data message based on one or more filtering or formatting rules, and transmits the transformed data message to a receiving system associated with the subscription.

20 Claims, 6 Drawing Sheets

(56) References Cited

U.S. PATENT DOCUMENTS

| | | | |
|---|---|---|---|
| 8,549,405 B2* | 10/2013 | Bugenhagen | H04L 41/5009 |
| | | | 709/224 |
| 8,619,600 B2* | 12/2013 | Morrill | H04L 45/123 |
| | | | 370/395.42 |
| 9,313,637 B2 | 4/2016 | Mitchell, Jr. et al. | |
| 9,510,169 B2 | 11/2016 | Singer et al. | |
| 9,986,374 B2* | 5/2018 | Miasnik | G06F 16/2358 |
| 10,255,419 B1* | 4/2019 | Kragh | H04W 4/90 |
| | | | 455/404.1 |
| 10,547,916 B1* | 1/2020 | Liu | H04L 65/1056 |
| 10,582,343 B1* | 3/2020 | Patton | H04W 4/90 |
| 2002/0196741 A1* | 12/2002 | Jaramillo | H04L 51/18 |
| | | | 370/465 |
| 2003/0031164 A1* | 2/2003 | Nabkel | H04M 7/1225 |
| | | | 370/352 |
| 2006/0040639 A1 | 2/2006 | Karl et al. | |
| 2011/0111728 A1 | 5/2011 | Ferguson et al. | |
| 2013/0128776 A1* | 5/2013 | Singer | H04W 4/16 |
| | | | 370/259 |
| 2013/0143517 A1* | 6/2013 | Mitchell, Jr. | H04W 4/90 |
| | | | 455/404.1 |
| 2014/0051381 A1* | 2/2014 | Ginter, Jr. | H04M 1/575 |
| | | | 455/404.1 |
| 2015/0163642 A1* | 6/2015 | Bates | H04W 4/90 |
| | | | 455/404.2 |
| 2016/0014585 A1 | 1/2016 | Sundararaj et al. | |
| 2016/0316493 A1 | 10/2016 | Davis et al. | |
| 2017/0025000 A1* | 1/2017 | Lagassey | H04W 4/16 |
| | | | 370/259 |
| 2017/0032009 A1* | 2/2017 | Thakkar | G06F 16/2358 |
| 2018/0053401 A1* | 2/2018 | Martin | H04W 4/90 |
| | | | 455/404.2 |
| 2019/0174208 A1* | 6/2019 | Speicher | H04L 65/1056 |
| 2019/0325732 A1 | 10/2019 | Romano | |
| 2019/0373112 A1* | 12/2019 | Jensen | H04L 41/0893 |
| | | | 370/352 |

* cited by examiner

| Subscription | Event Type | Tenant | Agency |
|---|---|---|---|
| Agency A Records Management System (RMS) | Incident Created<br>Unit Dispatched<br>Unit En Route<br>Unit On Scene<br>Case Created | PSAP X | Agency A |
| Agency B RMS | Incident Created<br>Unit Dispatched<br>Unit On Scene<br>Incident Notes | PSAP X | Agency B |
| Agency A Fire Station Alerting System | Unit Dispatched | PSAP X | Agency A |
| Agency A Print Server | Unit Dispatched | PSAP X | Agency A |

FIG. 5A

| Tenant | Agency | Event Type | Subscriptions |
|---|---|---|---|
| PSAP X | Agency A | Incident Created | Agency A RMS |
| PSAP X | Agency A | Unit Dispatched | Agency A RMS<br>Agency A Fire Station Alerting System<br>Agency A Print Server |
| PSAP X | Agency A | Unit En Route | Agency A RMS |
| ... | ... | ... | . |

PLATFORM FOR EMERGENCY EVENT SUBSCRIPTIONS

CROSS REFERENCE TO RELATED APPLICATIONS

This application is a continuation of U.S. application Ser. No. 17/149,497, filed Jan. 14, 2021, which claims the benefit of and priority to U.S. Provisional Application No. 62/961,799, filed Jan. 16, 2020, the disclosures of which are hereby incorporated by reference herein in their entireties for all purposes.

BACKGROUND

Emergency call-taking and dispatch systems generate real-time data related to ongoing emergencies in the process of handling the call and dispatching emergency resources. This data is useful to various systems outside the call-taking and dispatch systems, such as records management systems (RMS), reporting systems, fire station alerting systems, and computer-aided dispatch systems. Different outside systems may want access to different sets of data. If a particular emergency call center dispatches resources for fire, medical, and police calls, various client systems can be configured to receive different subsets of the data generated by the emergency call center. For example, a fire station alerting system is interested in data describing dispatch of fire and medical resources, but the fire station does not need to receive data related to police operations. In addition, some clients may be authorized to access only some subset of data relating to emergency calls. For example, a client may be authorized to receive data describing activities of response units, but not personal information of the callers. Other clients, such as state-wide systems, may be authorized to access data from multiple emergency call centers.

Currently, authorized clients use custom integrations to emergency call handling systems to obtain emergency data. Existing solutions include point-to-point integrations from a call-taking system (e.g., an on-premise computer-aided dispatch system) to a client system. These custom integrations are complex to set up and difficult to update.

DESCRIPTION OF EXAMPLE EMBODIMENTS OF THE DISCLOSURE

Overview

The systems, methods and devices of this disclosure each have several innovative aspects, no single one of which is solely responsible for all of the desirable attributes disclosed herein. Details of one or more implementations of the subject matter described in this specification are set forth in the description below and the accompanying drawings.

Computer-aided dispatch (CAD) systems generate data in response to activities logged during response to emergency calls. A CAD system receives data related to emergency calls and provides a user interface to assist telecommunicators (e.g., call-takers and dispatchers) in handling the emergency call. The user interface may include information about the caller, information describing available resources for responding to the emergency, options to dispatch various resources, options for the telecommunicator to input information (e.g., information gathered from the caller), and other features. The activities performed by telecommunicators over the course of responding to an emergency call are logged in the CAD system and generate events. For example, a CAD system may generate events when an incident is created (e.g., when an emergency call is answered by the telecommunicator), when the telecommunicator dispatches a resource (e.g., a fire truck or an ambulance) to the incident, when the telecommunicator marks that the resource has arrived at the incident, when the telecommunicator closes the incident, etc. Each event may include various identifiers, such as an incident identifier, an event type, and a timestamp. The event data varies based on the type of event, but may include one or more of data describing the caller (e.g., contact information, location), data describing the telecommunicator, and data describing units assigned to the emergency.

The event data generated by the CAD system is useful to various parties besides the telecommunicators directly handling calls. For example, station alerting systems implemented at fire stations or emergency medical service (EMS) stations provide in-station alerts to first responders when a telecommunicator dispatches a unit from the station. As another example, various records management systems, reporting systems, and data warehouses maintain data describing CAD events, and may perform data analysis or audits on the recorded data. As a further example, public-facing websites may provide certain CAD event data, such as a live-incident list or incident map describing ongoing emergency situations, as a public service.

As noted above, prior emergency CAD systems relied on custom integrations, typically configured on-site at an emergency call center, to provide CAD data to outside parties. In a cloud-based CAD system, rather than installing the CAD software on-site at individual emergency call centers, the CAD software runs remotely and provides user interfaces to telecommunicators located at the emergency call center or elsewhere. This cloud-based architecture enables a more streamlined event subscription system that does not rely on custom point-to-point integrations.

As described herein, the cloud-based CAD system includes an event subscription system that allows authorized parties to subscribe to real-time CAD event data. The event subscription system is highly configurable, allowing parties to receive event data relating to particular categories or types of events. The event system enables authorized parties to set up to receive real-time event data without custom integrations, and provides a simple interface for clients to update their subscriptions. The event subscription system can also easily aggregate data from multiple emergency call centers, e.g., for regional or state-wide reporting, without requiring a custom integration to each individual call center. Furthermore, the cloud-based CAD can aggregate data from additional data sources not typically available to on-site CAD systems, such as mobile location data provided by mobile device providers, and provide this additional data to authorized parties through the event subscription system.

In one aspect, a system for executing a data subscription system includes processing circuitry and a memory. The system includes an event emitter and a distribution module. The event emitter is configured to receive domain event data describing a domain event related to an emergency call, the domain event data comprising a tenant identifier identifying a tenant associated with the domain event; identify a subscription queue subscribed to the domain event data based on the tenant identifier, the subscription queue associated with a receiving system; and add a data message comprising at least a subset of the domain event data to the subscription queue. The distribution module is configured to retrieve the data message from the subscription queue; transform the data message based on a rule associated with the receiving system; and transmit the transformed data message to the receiving system.

In another aspect, a method for providing emergency data to receiving systems is provided. The method includes receiving domain event data describing a domain event related to an emergency call, the domain event data comprising a tenant identifier identifying a tenant associated with the domain event; identifying a subscription queue subscribed to the domain event data based on the tenant identifier, the subscription queue associated with a receiving system; adding a data message comprising at least a subset of the domain event data to the subscription queue; transforming the data message based on a rule associated with the receiving system; and transmitting the transformed data message to the receiving system.

In still another aspect, a system includes a memory and processing circuitry. The memory is configured to store subscription data describing event data received by each of a plurality of receiving systems. The processing circuitry is configured to receive a user input from a user of a web-based computer-aided dispatch (CAD) service; generate event data based on the user input, the event data describing an event related to an emergency call being handled by the user; identify, based on the event data and the subscription data, a subscription subscribed to the event data, the subscription associated with a particular one of the plurality of receiving systems; and transmit at least a portion of the event data to the particular one of the receiving systems.

As will be appreciated by one skilled in the art, aspects of the present disclosure, in particular aspects of the emergency event subscription system, described herein, may be embodied in various manners—e.g. as a method, a system, a computer program product, or a computer-readable storage medium. Accordingly, aspects of the present disclosure may take the form of an entirely hardware embodiment, an entirely software embodiment (including firmware, resident software, micro-code, circuit designs, etc.) or an embodiment combining software and hardware aspects that may all generally be referred to herein as a "circuit," "module" or "system." Functions described in this disclosure may be implemented as an algorithm executed by one or more hardware processing units, e.g. one or more microprocessors, of one or more computers. In various embodiments, different steps and portions of the steps of each of the methods described herein may be performed by different processing units. Furthermore, aspects of the present disclosure may take the form of a computer program product embodied in one or more computer-readable medium(s), preferably non-transitory, having computer-readable program code embodied, e.g., stored, thereon. In various embodiments, such a computer program may, for example, be downloaded (updated) to the existing devices and systems or be stored upon manufacturing of these devices and systems.

In the following detailed description, various aspects of the illustrative implementations may be described using terms commonly employed by those skilled in the art to convey the substance of their work to others skilled in the art. For example, the term "connected" means a direct electrical or magnetic connection between the things that are connected, without any intermediary devices, while the term "coupled" means either a direct electrical or magnetic connection between the things that are connected, or an indirect connection through one or more passive or active intermediary devices. The term "circuit" means one or more passive and/or active components that are arranged to cooperate with one another to provide a desired function. The terms "substantially," "close," "approximately," "near," and "about," generally refer to being within +/−20%, preferably within +/−10%, of a target value based on the context of a particular value as described herein or as known in the art. Similarly, terms indicating orientation of various elements, e.g., "coplanar," "perpendicular," "orthogonal," "parallel," or any other angle between the elements, generally refer to being within +/−5-20% of a target value based on the context of a particular value as described herein or as known in the art.

The terms such as "over," "under," "between," and "on" as used herein refer to a relative position of one material layer or component with respect to other layers or components. For example, one layer disposed over or under another layer may be directly in contact with the other layer or may have one or more intervening layers. Moreover, one layer disposed between two layers may be directly in contact with one or both of the two layers or may have one or more intervening layers. In contrast, a first layer described to be "on" a second layer refers to a layer that is in direct contact with that second layer. Similarly, unless explicitly stated otherwise, one feature disposed between two features may be in direct contact with the adjacent features or may have one or more intervening layers.

For the purposes of the present disclosure, the phrase "A and/or B" means (A), (B), or (A and B). For the purposes of the present disclosure, the phrase "A, B, and/or C" means (A), (B), (C), (A and B), (A and C), (B and C), or (A, B, and C). The term "between," when used with reference to measurement ranges, is inclusive of the ends of the measurement ranges. As used herein, the notation "A/B/C" means (A), (B), and/or (C).

The description uses the phrases "in an embodiment" or "in embodiments," which may each refer to one or more of the same or different embodiments. Furthermore, the terms "comprising," "including," "having," and the like, as used with respect to embodiments of the present disclosure, are synonymous. The disclosure may use perspective-based descriptions such as "above," "below," "top," "bottom," and "side"; such descriptions are used to facilitate the discussion and are not intended to restrict the application of disclosed embodiments. Unless otherwise specified, the use of the ordinal adjectives "first," "second," and "third," etc., to describe a common object, merely indicate that different instances of like objects are being referred to, and are not intended to imply that the objects so described must be in a given sequence, either temporally, spatially, in ranking or in any other manner.

In the following detailed description, reference is made to the accompanying drawings that form a part hereof, showing, by way of illustration, some of the embodiments that may be practiced. In the drawings, same reference numerals refer to the same or analogous elements/materials so that, unless stated otherwise, explanations of an element/material with a given reference numeral provided in context of one of the drawings are applicable to other drawings where elements/materials with the same reference numerals may be illustrated. For convenience, if a collection of drawings designated with different letters are present, e.g., FIGS. 2A-2C, such a collection may be referred to herein without the letters, e.g., as "FIG. 2." The accompanying drawings are not necessarily drawn to scale. Moreover, it will be understood that certain embodiments can include more elements than illustrated in a drawing, certain embodiments can include a subset of the elements illustrated in a drawing, and certain embodiments can incorporate any suitable combination of features from two or more drawings.

Various operations may be described as multiple discrete actions or operations in turn in a manner that is most helpful in understanding the claimed subject matter. However, the order of description should not be construed as to imply that these operations are necessarily order dependent. In particular, these operations may not be performed in the order of presentation. Operations described may be performed in a different order from the described embodiment. Various additional operations may be performed, and/or described operations may be omitted in additional embodiments.

In some examples provided herein, interaction may be described in terms of two, three, four, or more electrical components. However, this has been done for purposes of clarity and example only. It should be appreciated that the devices and systems described herein can be consolidated in any suitable manner. Along similar design alternatives, any of the illustrated components, modules, and elements of the accompanying drawings may be combined in various possible configurations, all of which are clearly within the broad scope of the present disclosure. In certain cases, it may be easier to describe one or more of the functionalities of a given set of flows by only referencing a limited number of electrical elements.

The following detailed description presents various descriptions of specific certain embodiments. However, is to be understood that other embodiments may be utilized, and structural or logical changes may be made without departing from the scope of the present disclosure. In general, the innovations described herein can be embodied in a multitude of different ways, for example, as defined and covered by the claims and/or select examples, and the following detailed description is not to be taken in a limiting sense.

Example Emergency Call Data Environment

Figure 1:
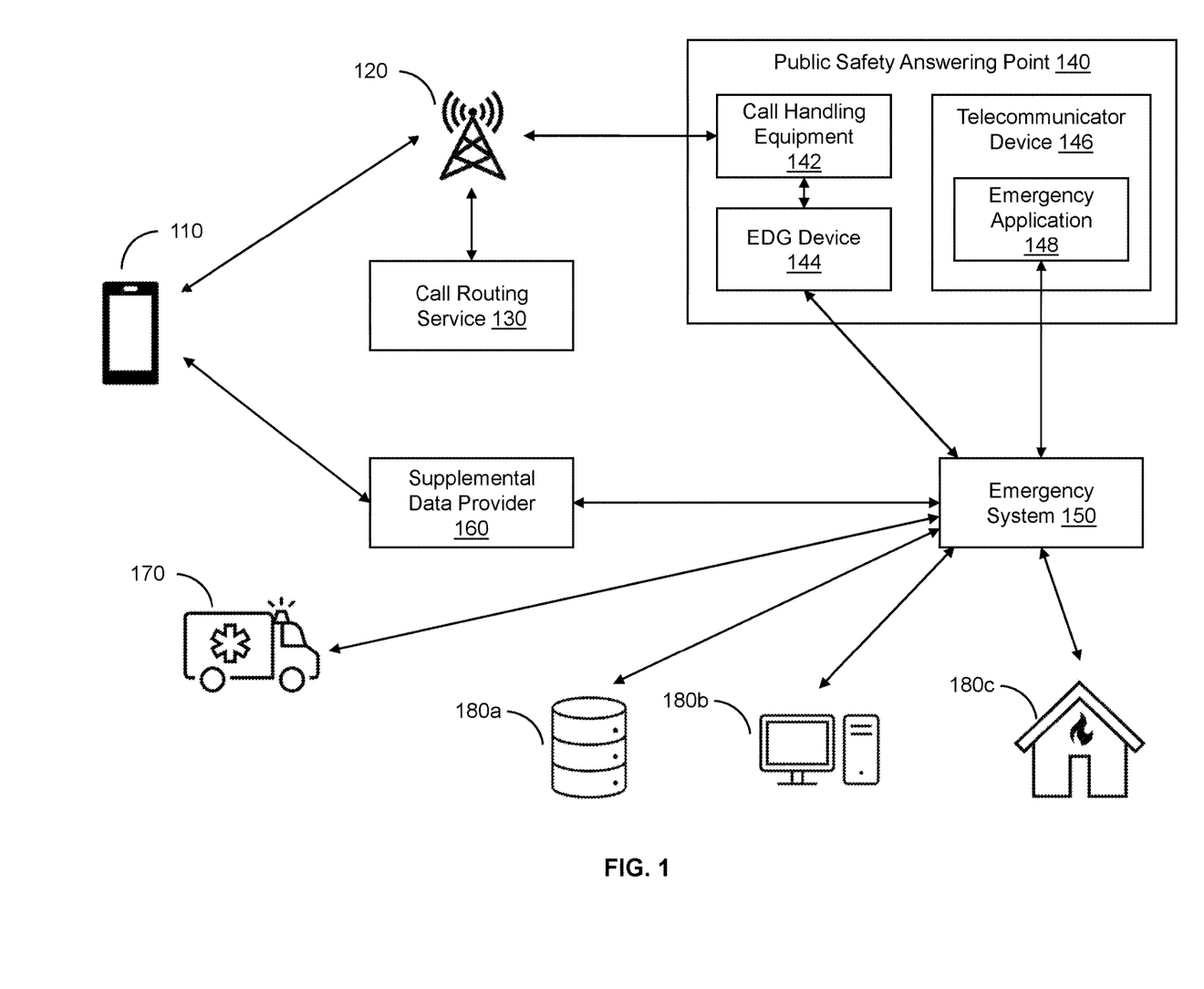
FIG. 1 is a system diagram illustrating an environment of an emergency system configured for providing data associated with an emergency to various receiving systems according to some embodiments of the present disclosure.

FIG. 1 is a system diagram illustrating an environment of an emergency system configured for providing data associated with an emergency to various receiving systems according to some embodiments of the present disclosure. The environment includes a mobile device 110, a cell tower 120, a call routing service 130, a public safety answering point (PSAP) 140, an emergency system 150, a supplemental data provider 160, a first responder 170, and receiving systems 180a-180c. Only one of the mobile device 110, cell tower 120, call routing service 130, PSAP 140, supplemental data provider 160, and first responder 170 are shown for simplicity; it should be understood that in a working system environment, there may be more of each of these elements. Furthermore, while only three receiving systems 180 are shown, in a working system environment, there may be many more receiving systems 180.

The mobile device 110 may be a cell phone, a smart phone, a tablet, or another device capable of initiating emergency reporting. The mobile device 110 has a user interface (e.g., a touchscreen, buttons, microphone, speaker, camera, etc.) for interacting with a user. The mobile device 110 further includes wireless communications circuitry that connects the mobile device 110 to a mobile network to initiate an emergency communication, e.g., to place an emergency call or send a text message. In this example, the mobile device 110 connects to a cellular network via the cell tower 120. In other examples, the mobile device 110 may additionally or alternatively connect to an Internet-based network via a wired or wireless connection (e.g., Wi-Fi), or to one or more other types of networks.

The cell tower 120 is one component of a cellular network that enables wireless communication between mobile devices, and enables communication between wireless devices (e.g., the mobile device 110) and other networked communications devices or systems (e.g., the PSAP 140). Additional cell towers and other networking equipment are directly or indirectly coupled to the cell tower 120 for routing calls placed by mobile devices 110. When a user of the mobile device 110 makes an emergency call, such as a 9-1-1 call, the cell tower 120, or a network element coupled to the cell tower 120, interacts with a call routing service 130. The call routing service 130 determines an initial location estimate of the mobile device 110 based on the location of the cell tower 120. In some examples, the call routing service 130 may determine the location of the mobile device 110 based on alternative or additional information, such as the location of one or more additional cell towers in range of the mobile device 110, or a location provided by the mobile device 110.

The call routing service 130 routes the emergency call from the mobile device 110 to a particular PSAP 140 based on the initial location estimate. The PSAP 140 may cover a particular geographic region, e.g., a city, a county, a group of counties, a highway system, a park system, etc. The call routing service 130 identifies a PSAP (e.g., PSAP 140) that covers the location estimate of the mobile device 110 by comparing the location estimate of the mobile device 110 to the geographic boundaries associated with a set of PSAPs. The mobile device 110 communicates with telephony equipment in the selected PSAP 140 via the cell tower 120 and additional networking equipment not shown in FIG. 1.

The PSAP 140 is an emergency call handling system. The PSAP 140 includes call handling equipment (CHE) 142, an emergency data gateway (EDG) device 144, and a telecommunicator device 146 executing an emergency application 148. The PSAP 140 receives and handles calls from the telephony network, which includes the cell tower 120. While the PSAP 140 is shown handling a call from a mobile device 110, the PSAP 140 may also receive calls from landline telephones and other communication devices and systems.

The CHE 142 interfaces with the telephony network to receive emergency calls routed to the PSAP 140. The CHE 142 creates a call event for each received call, such as an emergency call from mobile device 110. The CHE 142 associates call data, such as caller location information, call routing actions, Automatic Call Distribution (ACD) events, and other telemetry data, with the call event. Call data may also include the phone number and contact name of the user of the mobile device 110, class of service, mobile service provider, a time stamp, and other information describing the user, mobile device 110, network, etc. The CHE 142 may output call data in one of a variety of data output formats, such as Automatic Location Information (ALI), Call Detail Record (CDR), or National Emergency Number Association (NENA) i3 Logging.

In the example shown in FIG. 1, an EDG device 144 installed at the PSAP 140 connects to the CHE 142. The EDG device 144 receives the call data from the CHE 142 and parses and formats the call data into a consistent data format. The EDG device 144 connects to an emergency system 150 via a network, such as the Internet, and the EDG device 144 transmits the formatted call data to the emergency system 150 via the network. The use of an EDG device 144 to transfer data from a CHE 142 to a cloud-based emergency system 150 is described in U.S. Pat. No. 10,264,122, incorporated by reference in its entirety. In another example, a central customer-premises equipment (CPE) host located outside the PSAP 140 receives call information for a group of PSAPs and distributes the call information to a selected PSAP, e.g., PSAP 140. In this example, a multi-tenant emergency call data relay may capture call data from the central CPE host and transmit the captured call data to the emergency system 150. The use of the data relay, and the data relay in combination with one or more EDG devices, is described in U.S. patent application Ser. No. 17/070,400, incorporated by reference in its entirety. In other implementations, alternative mechanisms may be used to transfer call data from the PSAP 140 to the emergency system 150.

The PSAP 140 further includes a telecommunicator device 146. In this example, the telecommunicator device 146 is a computer system operated by a telecommunicator on-site at the PSAP 140. In other embodiments, the telecommunicator device 146 is at a different location from the PSAP 140, e.g., at a backup facility, mobile command center, remote worksite, etc. The telecommunicator device 146 includes the hardware and software needed to display user interfaces, connect to an IP-based network, and detect user input. The telecommunicator device 146 includes an emergency application 148 that allows interaction with the emergency system 150. In one embodiment, the emergency application 148 is a browser that allows a telecommunicator to access a web-based CAD service provided by the emergency system 150. In another embodiment, the emergency application 148 is a dedicated application provided by the emergency system 150 to enable interactions with the emergency system 150. The PSAP 140 may include multiple telecommunicator devices 146, each used by a different telecommunicator.

The emergency system 150 assists telecommunicators in responding to emergency calls. The emergency system 150 may be a cloud-based processing system embodied on one or more remote servers and connected to the telecommunicator device 146 via the Internet or another communications network. While the emergency system 150 is shown as being outside the PSAP 140, in other embodiments, some or all of the functions performed by the emergency system 150 and described herein may alternatively be performed by on-site hardware located within a PSAP 140. Detailed functionality of the emergency system 150 is described with respect to FIG. 2.

The emergency system 150 supports various tenants, such as the PSAP 140. As used herein, a "tenant" is an entity that receives one or more services provided by the emergency system 150, such as a CAD service, a mapping service, a data analytics service, etc. For example, each PSAP that uses the CAD service provided by the emergency system 150 may be considered a tenant of the emergency system 150. Each tenant may support multiple end users, such as multiple telecommunicators each working in the PSAP 140 and each using a respective telecommunicator device 146. Each telecommunicator device associated within a given tenant (e.g., within a given PSAP 140) has an associated position number. In some examples, a tenant system may include a set of telecommunicator devices that are located across multiple physical locations. For example, a single tenant may extend across multiple PSAPs managed by a single agency or cooperating set of agencies. As another example, a tenant may support end users in one or more backup, mobile, or remote locations, instead of or in addition to a PSAP or set of PSAPs.

The emergency system 150 receives the formatted call data generated by the EDG device 144, processes the received formatted call data, and generates user interfaces for display by the emergency application 148. While one PSAP 140 is shown in FIG. 1, as noted above, the environment may include many similar PSAPs or other tenants, and the emergency system 150 may receive call data from many tenants, e.g., from EDG devices 144 installed across many PSAPs. In addition, the emergency system 150 may receive call data from one or more multi-tenant emergency call data relays at one or more central emergency call handling hosts.

The emergency system 150 may also receive supplemental data from one or more supplemental data sources. The supplemental data sources are separate from the PSAP 140, and in particular, separate from the CHE 142 and EDG device 144 which provide the call data described above. The supplemental data provided by the supplemental data sources includes data describing emergencies that reaches the emergency system 150 through one or more alternate pathways. Supplemental data may include various types of information, such as location information; contact information, such as a phone number; other data that can be used to correlate the supplemental data to an emergency call, such as phone number, name, time stamp, location, etc.; language information (e.g., a device language of the mobile device 110); health information; real-time video; images; etc.

The supplemental data provider 160 is an example supplemental data source. The supplemental data provider 160 provides supplemental data related to the mobile device 110 making an emergency call. The supplemental data may include the location of the mobile device 110, frequent or saved locations of the mobile device 110, identifying information of the mobile device 110 (e.g., telephone number, customer name), a primary language of the customer and/or mobile device 110, medical history information, car crash detection data, a time stamp, and any other information that may be useful to the emergency system 150, a telecommunicator, and/or an emergency responder. The mobile device 110 may determine its location based on, for example, GPS signals, WiFi signals, Bluetooth signals, cell towers, or other signals, or a combination of signals. The device-derived locations included in supplemental data are typically more accurate and precise than the location provided in the call data, e.g., the locations based on cell phone towers used for routing calls. In addition, due to lags in existing call handling infrastructure, the device-derived locations are also typically available to the emergency system 150 faster than the call data, and faster than the device-derived locations are currently provided to on-site CAD system.

In some embodiments, the supplemental data provider 160 automatically transmits the supplemental data to the emergency system 150 in response to an emergency call being placed by the mobile device 110. In some embodiments, the supplemental data provider 160 transmits the supplemental data in response to a query from the emergency system 150. The supplemental data provider 160 may be a web server associated with a mobile device provider. For example, the supplemental data provider 160 is operated by a mobile phone company that programs the mobile device 110 to transmit its location to the supplemental data provider 160 when a user of the mobile device 110 initiates an emergency communication (e.g., when the user places an emergency call or sends an emergency text message). As another example, a supplemental data provider 160 is operated by a software provider whose software executes on the mobile device 110 and accesses the user device's location. In still another example, the supplemental data provider 160 is implemented by the mobile device itself 110, e.g., as a software module of the mobile device 110. In this example, the mobile device 110 is programmed (e.g., by a mobile device provider or software provider) to transmits its location and/or other supplemental data directly to the emergency system 150 in response to the user initiating an emergency communication. The system environment may include multiple supplemental data providers 160 associated with different mobile device providers and/or different software providers.

In addition to the supplemental data provider 160 receiving data from the mobile device 110, other secondary data sources not shown in FIG. 1 may provide location data and/or other data about emergencies to the emergency system 150. For example, a vehicle communication provider may provide the location of the vehicle and vehicle condition information (e.g., whether a crash was detected) to the emergency system 150. A vehicle connected to the vehicle communication provider may alert the vehicle communication provider to an emergency in response to a user action (e.g., a user pressing a button in the vehicle) or automatically (e.g., in response to an automatic crash detection). Another example supplemental data source is a panic button data source that provides the location of a user who pressed a panic button to the emergency system 150. A panic button provider may provide additional information to the emergency system 150 describing the user (e.g., medical history information) and, if available, the type of emergency (e.g., that the user reported a fall or a home invasion). Still another example supplemental data source is a connected security system including one or more of a smart doorbell, a camera, a motion sensor, a fire detector, etc. In response to a user-initiated or automatically detected emergency, a home security service that manages the connected security system may provide an address of the security system, any available real-time video, and other security data (e.g., lock tamper attempts, alarm triggers, etc.) to the emergency system 150.

The emergency system 150 aggregates supplemental data received from the supplemental data sources and call data received from PSAPs, such as the PSAP 140. For example, for a given call, the emergency system 150 receives call data from the EDG device 144, including the telephone number of the mobile device 110, and a supplemental data signal from the supplemental data provider 160 that includes a real-time location of the mobile device 110. By aggregating call data from the PSAPs and supplemental data, the emergency system 150 can provide a more complete picture of the emergencies within the jurisdiction of a given PSAP 140 than prior systems.

As noted above, in some embodiments, the emergency system 150 is a web-based CAD system that manages a CAD service provided to telecommunicators. The emergency system 150 and emergency application 148 cooperate to generate user interfaces with information about emergency calls and first responders for display to telecommunicators. The information provided via the user interfaces includes call data and supplemental data received at the emergency system 150, as described above. In response to an emergency call, a telecommunicator may dispatch one or more emergency resources (e.g., fire, medical/EMS, and/or police) to the incident location. An example first responder 170 is shown in FIG. 1; in this example, the first responder 170 is a medical resource, e.g., an ambulance staffed by paramedics or emergency medical technicians (EMTs). The user interfaces provided by the emergency application 148 displays information to telecommunicators about first responders, e.g., the location and status of emergency responder 170. The user interfaces may further enable telecommunicators to dispatch first responders to the locations of emergencies. The emergency system 150 receives selections and information input by the telecommunicator into the emergency application 148, e.g., additional information about a caller, selections for responding to the call, information about first responders who were dispatched, etc.

In addition to receiving information input by telecommunicator and information received from the EDG device 144 and supplemental data sources, the emergency system 150 may also receive information from other parties involved in emergency response, including first responders. For example, the emergency system 150 may interact with a mobile application running on mobile devices (e.g., smartphones or tablets) provided to first responders, or an application installed on devices within first responders' vehicles (e.g., a laptop computer mounted in an ambulance, fire engine, or police car). As another example, the first responder vehicle (e.g., the ambulance 170) may include a GPS device that transmits a real-time location to the emergency system 150, so that the emergency system 150 can track the motion of the first responder in real-time.

The emergency system 150 generates events in response to various actions by the telecommunicator and/or other parties over the course of responding to an emergency call. For example, the emergency system 150 generates events when an incident is created (e.g., when an emergency call is received), when the dispatcher dispatches an asset (e.g., a fire truck or an ambulance) to the incident, when a unit arrives at the incident, when the incident is closed, etc. As noted above, the event data of the emergency system 150 is useful to various parties besides the telecommunicators directly handling calls. The emergency system 150 includes an event subscription system that enables authorized clients to subscribe to and receive real-time event data from the emergency system 150. The event subscription system is described in further detail in relation to FIGS. 2-7.

Receiving systems 180a-180c are three example systems configured to receive event data from the event subscription system. The receiving systems 180 may also be referred to as subscribers. In some examples, a receiving system 180 may receive multiple subscriptions from the emergency system 150. The first example receiving system 180a is a database system, e.g., a data warehouse for storing data relating to emergency events. For example, the database system 180a is an RMS for storing data from emergency calls received by a particular PSAP or located within a particular county or other region. The database system 180a may receive and store data from one or more additional systems, e.g., from the call handling equipment 142, the supplemental data provider 160, and/or other systems not shown in FIG. 1.

The second example receiving system 180*b* is an emergency monitoring system that receives and displays data relating to emergency events, but is not involved in call-taking or dispatch. The emergency monitoring system 180*b* may be a public-facing app or website that provides emergency data, such as a live-incident list or map, as a public service. As another example, the emergency monitoring system 180*b* may be a governmental authority, e.g., a regional or state-wide emergency management office, that oversees emergency response across the state or region.

The third example receiving system 180*c* is a station alerting system for providing in-station alerts to first responders at their fixed locations, e.g., at a fire station. The station alerting system 180*c* may receive event data for events involving a particular emergency response agency, e.g., a fire department. The station alerting system 180*c* may transmit event data to a particular station for which the event data is relevant. For example, if the fire department has 15 fire stations, and engines from two of the fire stations are dispatched by the telecommunicator using the emergency system 150, the emergency system 150 provides the event data dispatching the two engines to the station alerting system 180*c*, and the station alerting system 180*c* transmits alerts to the two fire stations where the dispatched engines are stationed. Within each station, the station alerting system 180*c* may provide alarms, paging tones, displays (e.g., for displaying apparatus(es) dispatched, incident address, incident details, and other incident information), a printout with the incident information, or alternate or additional types of alerts.

Example Emergency System

Figure 2:
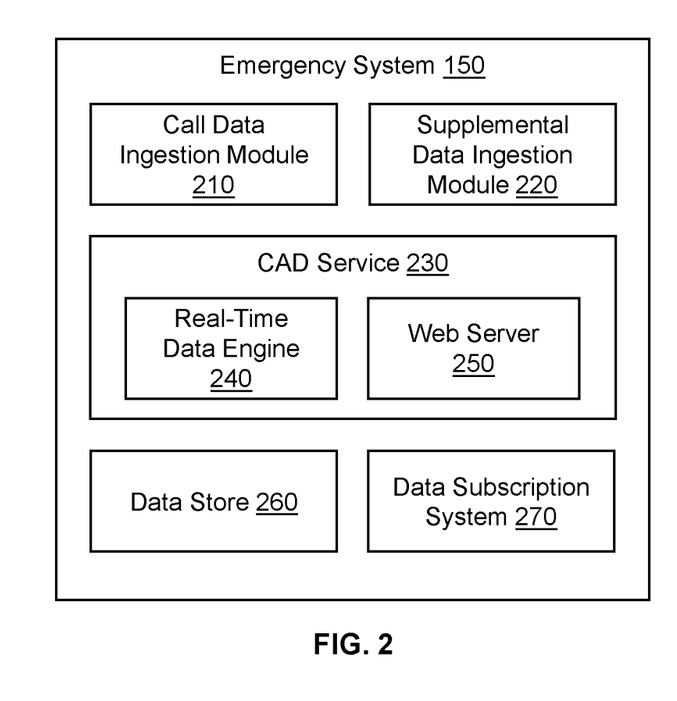
FIG. 2 is a block diagram of the emergency system according to some embodiments of the present disclosure.

FIG. 2 is a block diagram of the emergency system 150 according to some embodiments of the present disclosure. The emergency system 150 includes a call data ingestion module 210, a supplemental data ingestion module 220, a CAD service 230 that includes a real-time data engine 240 and a web server 250, a data store 260, and a data subscription system 270. In alternative configurations, different and/or additional components may be included in the emergency system 150. Additionally, functionality described in conjunction with one or more of the components shown in FIG. 2 may be distributed among the components in a different manner than described in conjunction with FIG. 2 in some embodiments.

The call data ingestion module 210 receives and processes call data related to emergency calls received at PSAPs, e.g., call data received by the EDG device 144 within the PSAP 140 and transmitted to the emergency system 150. The call data ingestion module 210 may receive and process call data from other sources, such as one or more multi-tenant emergency call data relays, which may be used in combination with one or more EDG devices. In some embodiments, the EDG devices are configured to transmit data to the emergency system 150 in a common format. In other embodiments, the call data ingestion module 210 is configured to parse and reformat data received from PSAPs into a common format used by the emergency system 150. The call data ingestion module 210 may determine whether each data message describes a new call or an existing call and associates call data related to the same call. The call data ingestion module 210 outputs call data to the real-time data engine 240 for real-time processing and/or the data store 260 for storage.

The supplemental data ingestion module 220 receives and processes supplemental data provided by one or more supplemental data sources separate from the source of the call data, e.g., the supplemental data provider 160 shown in FIG. 1. At least some of the supplemental data may include a location of an emergency. The supplemental data ingestion module 220 may parse supplemental data messages and reformat the parsed supplemental data into a common format used by the emergency system 150. The supplemental data ingestion module 220 may determine whether each supplemental data message is related to a prior supplemental data message (e.g., an updated location, additional camera footage, etc.) or not, and may associate related supplemental data to streamline processing of follow-on data. The supplemental data ingestion module 220 outputs supplemental data to the real-time data engine 240 for real-time processing and/or the data store 260 for longer-term storage. The supplemental data ingestion module 220 may have a respective data interface for each supplemental data source of type of supplemental data source, e.g., based on the data format or communication protocol used by the supplemental data source. In some embodiments, each supplemental data source has a respective corresponding data ingestion module, e.g., one data ingestion module for each mobile device data provider, and one data ingestion module for each secondary data source.

The CAD service 230 includes a real-time data engine 240 and a web server 250. The real-time data engine 240 processes data related to emergency calls, including data received from the call data ingestion module 210, the supplemental data ingestion module 220, and the web server 250 (e.g., inputs from the telecommunicator via the emergency application 148). The web server 250 provides and interacts with the emergency application 148. The CAD service 230 may include various other modules not shown in FIG. 2, e.g., modules for enabling various elements included in or supported by the emergency application 148.

More specifically, the real-time data engine 240 performs real-time processing of data during an emergency call. The real-time data engine 240 parses incoming data messages, including call data and supplemental data from the call data ingestion module 210 and the supplemental data ingestion module 220, respectively. The real-time data engine 240 may extract or identify a telecommunicator position, location information, a caller phone number, caller name, and other available information from data messages. The real-time data engine 240 may retrieve additional data about the call or the caller as available based on the extracted data. For example, for a given emergency call, the real-time data engine 240 may receive call data from the call data ingestion module 210, and then retrieve supplemental location information, information about previous calls, medical history information, etc. from the supplemental data ingestion module 220, data store 260, and/or other data sources. The real-time data engine 240 provides data that may be used by the telecommunicator to the web server 250.

In addition, the real-time data engine 240 receives data messages from the web server 250 in response to inputs received at the web server 250 from the telecommunicators. As noted above, telecommunicators can take various actions within the emergency application 148 in the course of responding to an emergency call. Data describing these actions are passed from the web server 250 to the real-time data engine 240 for processing. In some embodiments, the web server 250 receives actions or other inputs from other devices and passes these inputs to the real-time data engine 240 for processing. For example, the web server 250 receives inputs from emergency responders' devices that run an application provided by the CAD service 230 and are enabled by the web server 250. The web server 250 passes such inputs from emergency responders to the real-time data engine 240 for processing.

In response to actions from the telecommunicators and other parties or devices, the real-time data engine 240 generates events that are used within the domain of the emergency system 150. These events are referred to as "domain events." Typical domain events in emergency response include, for example, incident created, incident dispatched, unit dispatched, unit en route, unit on scene, and incident closed. The real-time data engine 240 generates domain events responsive to input from telecommunicators in the emergency application 148, e.g., a telecommunicator dispatching a first responder, a telecommunicator creating a call record, a telecommunicator marking a responder as arrived on scene, etc. In some embodiments, the real-time data engine 240 may automatically generate domain events based on other received data. For example, if the real-time data engine 240 receives real-time locations from a device associated with the emergency responder 170 (e.g., a GPS tracker installed on an ambulance, or a mobile device of an EMT), the real-time data engine 240 may compare the location of the emergency responder 170 to the incident location and automatically create a Unit on Scene event in response to the location of the emergency responder 170 being within a given range of the incident location.

For each domain event, the real-time data engine 240 generates domain event data describing the domain event. The domain event data may include various identifiers, such as an incident identifier, an event type, and a timestamp. The domain event data includes a tenant identifier that identifies a tenant associated with a domain event. For example, an Incident Created domain event may include the tenant identifier associated with the PSAP handling the emergency call associated with the incident. In some examples, the domain event data further includes data describing the caller (e.g., contact information, location), data describing the telecommunicator(s) handling the emergency call, and/or data describing assets assigned to respond to the emergency. Different domain events may have different sets of data fields.

Domain events generated by the real-time data engine 240 are used throughout the emergency system 150. For example, the web server 250 receives the domain event data and, in some cases, incorporates at least some of the domain event data into user interfaces provided to telecommunicators, first responders, and/or other parties. The data store 260 may also receive and store the domain event data for later processing or reference. The data subscription system 270 receives the domain event data and provides data based on the domain events to various receiving systems, e.g., the receiving systems 180, as described further below. While the real-time data engine 240 is described as performing real-time processing of call data, supplemental data, and domain events, in some embodiments, one or more of these functions are performed by separate modules or distributed across multiple modules.

The web server 250 provides user interfaces for assisting in emergency response and receives input entered via the user interfaces. The web server 250 may provide a mapping interface, a call-taking interface, and a dispatch interface to the telecommunicator device 146. In some embodiments, the web server 250 provides a call-taking interface to a first telecommunicator device used by an emergency call taker and a dispatch interface to a second telecommunicator device used by a dispatcher. The web server 250 maintains information identifying each telecommunicator accessing the CAD service 230, such as a PSAP identifier and the position number within the PSAP. For a given emergency call, the web server 250 routes data received from the real-time data engine 240 to the appropriate telecommunicator by matching the PSAP identifier and position number extracted from the call data messages to the PSAP identifier and position number of the telecommunicator device 146 used by the telecommunicator handling the call and/or dispatching resources for the call. As discussed above, the web server 250 may provide additional user interfaces for other users, such as a user interface or set of user interfaces used by emergency responders.

The data store 260 provides storage of the call data, the supplemental data, the domain event data, and/or other data received or generated by the CAD service 230. The data store 260 may be encrypted. In some embodiments, the emergency system 150 includes a first data store for short-term storage (e.g., for ongoing emergency calls), and a second, longer-term data store accessed to perform periodic analyses. In some embodiments, the emergency system 150 includes different data stores for different types of data, e.g., a first data store for call data, a second data store for supplemental data, and a third data store for domain event data. The data store 260 may include one or more of a Binary Large OBject (BLOB) storage service, data warehouse, key-value database, document database, relational database, or any other type of data storage.

The data subscription system 270 enables a subscription service through which authorized receiving systems can subscribe to real-time CAD data. The data subscription system 270 stores data describing subscriptions provided to various receiving systems, such as the receiving systems 180a-180c shown in FIG. 1. The data subscription system 270 generates a queue of data for each subscription based on domain event data received from the real-time data engine 240 and the subscription data. The data subscription system 270 processes the data within each queue into a format usable by the corresponding receiving system 180 and transmits data from each queue to its respective receiving system. The subscription data can be easily configured and re-configured by subscribers so that subscribers can set up and revise their subscriptions, e.g., to change the type of data they receive, add additional subscriptions, change the formatting or filtering of their subscriptions, etc. The functionality and advantages of the data subscription system 270 are further described in relation to FIGS. 3-7.

Example Data Subscription System

Figure 3:
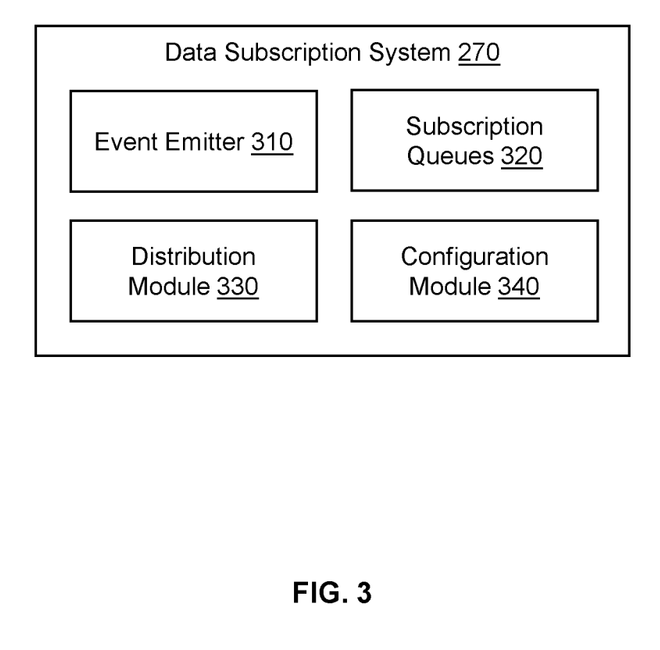
FIG. 3 is a block diagram of a data subscription system according to some embodiments of the present disclosure.

FIG. 3 is a block diagram of the data subscription system 270 according to some embodiments of the present disclosure. The data subscription system 270 includes an event emitter 310, subscription queues 320, a distribution module 330, and a configuration module 340. In alternative configurations, different and/or additional components may be included in the data subscription system 270. Additionally, functionality described in conjunction with one or more of the components shown in FIG. 3 may be distributed among the components in a different manner than described in conjunction with FIG. 3 in some embodiments.

The event emitter 310 receives domain event data from the real-time data engine 240. The domain event data describes a domain event related to an emergency call. The domain event data includes a tenant identifier identifying a tenant associated with the domain event, as described with respect to FIG. 2. The event emitter 310 compares the tenant identifiers and, in some cases, additional domain event data to subscription data, and adds data messages to subscription queues 320 that match the tenant identifiers and/or other data. The data subscription system 270 maintains a set of subscription queues 320, each of which is associated with one or more tenants and a particular receiving system 180. As noted above, each receiving system 180 may have one or more subscriptions; the data subscription system 270 creates a subscription queue 320 for each respective subscription. For a given domain event, the event emitter 310 identifies any subscriptions that are associated with the domain event, and the event emitter 310 adds data messages including at least some of the domain event data to the identified subscription queue or queues. The event emitter 310 is described in further detail in relation to FIG. 4.

The subscription queues 320 temporarily store data messages for the subscriptions. The subscription queues 320 may be first-in-first-out (FIFO) queues. The distribution module 330 retrieves data messages from the subscription queues 320 and processes the data messages. For example, the distribution module 330 may transform the data messages based on one or more rules associated with the subscription or the receiving system 180. The distribution module 330 transmits the processed data messages to the receiving systems 180. The distribution module 330 is described in greater detail in relation to FIGS. 6 and 7.

The configuration module 340 enables receiving systems 180 to configure and re-configure their subscription or subscriptions. For example, the configuration module 340 may provide user interfaces with which a user at the receiving system 180, a user at a tenant (e.g., a PSAP administrator), or a user of the emergency system 150 (e.g., an administrator at the emergency system 150) may set input configuration details for the subscription. The configuration details may include information identifying the receiving system receiving the subscription, information identifying the tenant or tenants for which the receiving system receives data, information identifying one or more agencies for which the receiving system receives data (e.g., a particular fire agency dispatched by a PSAP that handles fire, police, and medical calls), and a list of event types the receiving system receives. The configuration details may further include one or more formatting options, such as text or numerical formatting, splitting data into multiple data fields (e.g., splitting an address into a number and street name), or combining data from multiple data fields. Additional configuration details may include filtering rules, e.g., filtering out certain data messages (e.g., selecting only certain event types, or only event types within a particular geographic region or assigned to a particular agency), or filtering out certain types of data. The configuration details may further specify a delivery format, including delivery mechanism (e.g., webhooks or SFTP) and message payload formatting (e.g., JSON or XML). Still other configuration details may specify permissions information, e.g., what types of data particular receiving systems 180 are permitted or are not permitted to receive. For example, a receiving system 180 that provides a public website with emergency data may not have access to certain personal information, such as the names and phone numbers of emergency callers. The configuration module 340 may further enable receiving systems 180 to adjust their configuration settings after the subscriptions have been set up.

Example Process for Emitting Events to Subscription Queues

Figure 4:
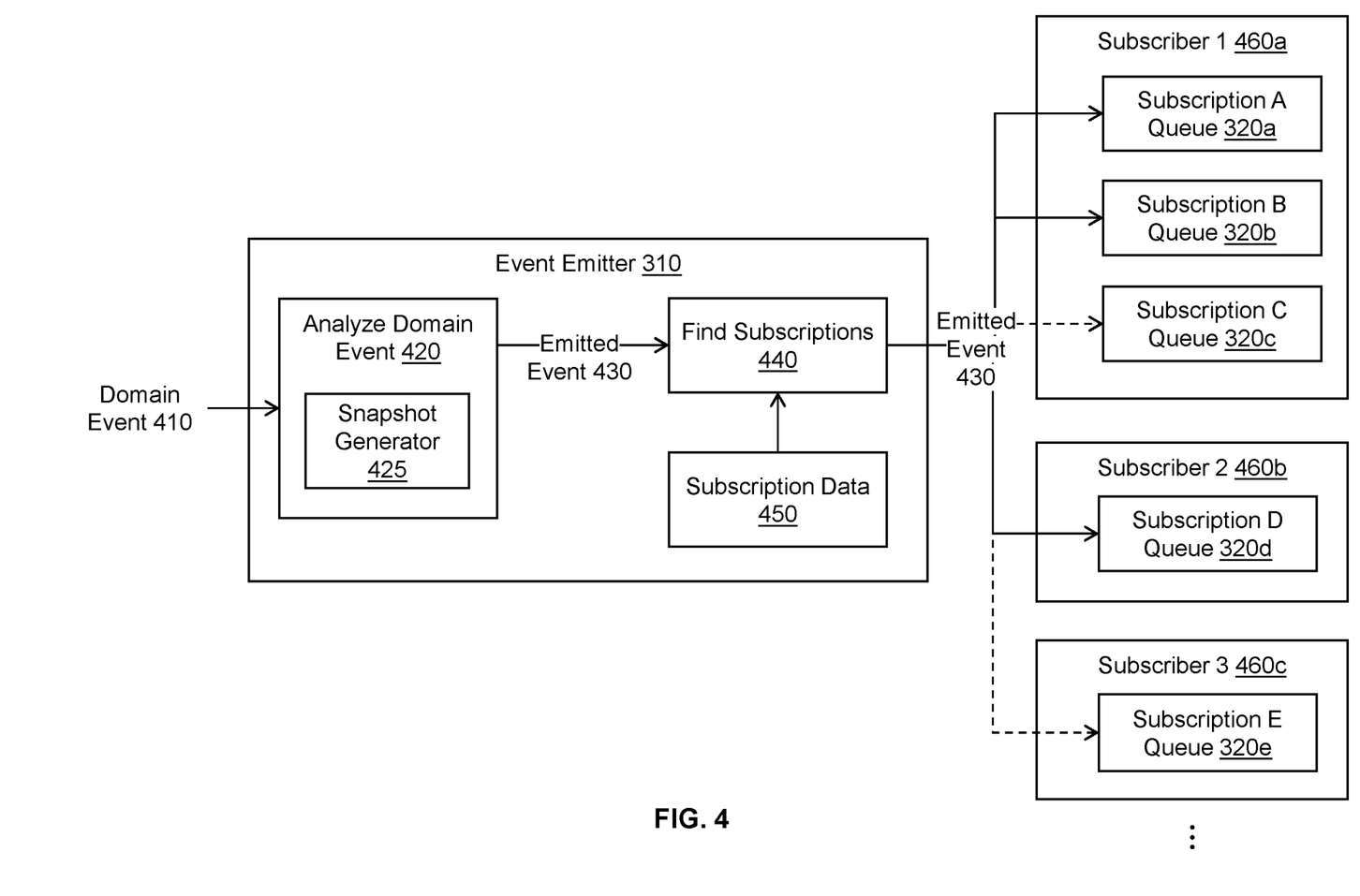
FIG. 4 is a flow diagram illustrating an event emitter emitting an event to subscription queues according to some embodiments of the present disclosure.

FIG. 4 is a flow diagram illustrating an event emitter emitting an event to subscription queues according to some embodiments of the present disclosure. The event emitter 310 receives a domain event 410 generated by the CAD service 230, e.g., by the real-time data engine 240. The domain event 410 includes domain event data, such as the domain event data described above. The event emitter 310 may include a first module 420 to analyze the domain event data and a second module 440 to find subscriptions matching the domain event. The first module 420 receives and analyzes the domain event 410. In some cases, the first module 420 passes the domain event data to the second module 440 as an emitted event 430. In some cases, the first module 420 performs filtering and/or formatting of the domain event data, and outputs the filtered and/or formatted data as an emitted event 430.

In some cases, the first module 420 generates a snapshot of multiple domain events 410, and passes the snapshot to the second module 440 as an emitted event 430. In the example shown in FIG. 4, the first module 420 includes a snapshot generator 425. The snapshot generator 425 collects multiple domain events into a single record or "snapshot", and the first module 420 outputs the single record as an emitted event 430. The snapshot generator 425 may collect a particular set of domain events for each emergency call or incident into a snapshot for that emergency call or incident, or may collect all domain events for a given emergency call or incident into a snapshot for that emergency call or incident. The snapshot generator 425 may generate multiple types of snapshots with different sets of domain events. The snapshot generator 425 may output a snapshot after the snapshot or incident is complete, or the snapshot generator 425 may output one or more incomplete snapshot while the incident is in progress, e.g., after each new domain event is added to a snapshot.

Figure 5A:
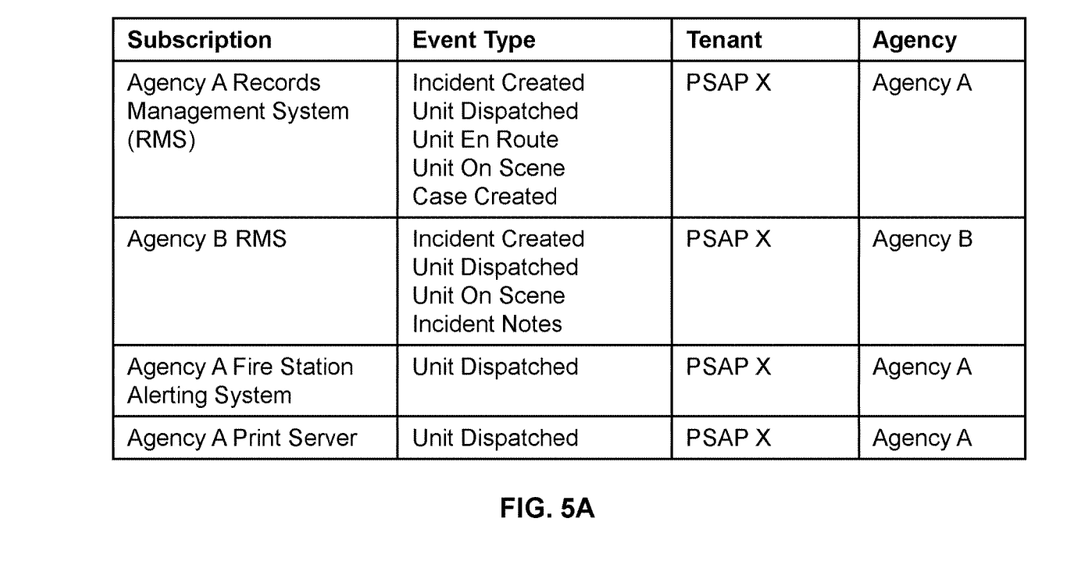
FIGS. 5A and 5B provide two illustrations of subscription data used by the data subscription system according to some embodiments of the present disclosure.
Figure 5B:
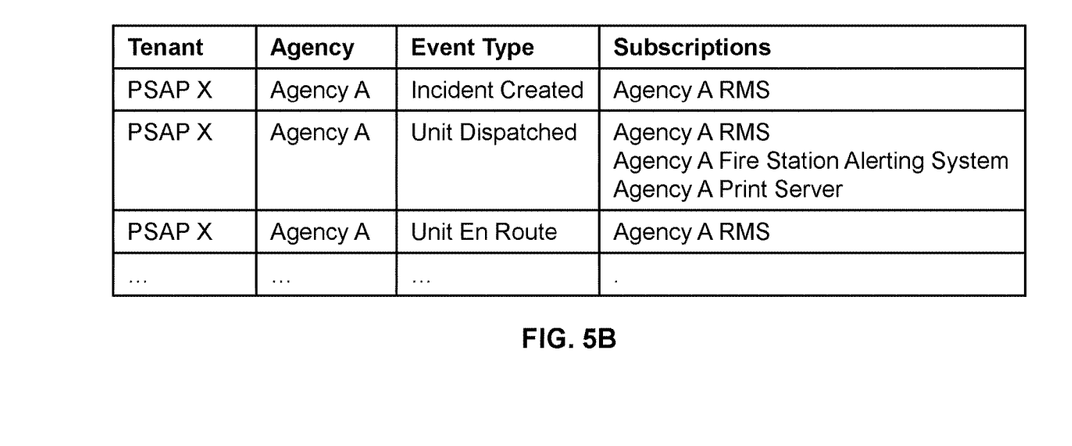

The second module 440 receives the emitted event 430 and finds subscriptions configured to receive the emitted event 430. The second module 440 references stored subscription data 450 that specifies which emitted events 430 are assigned to each subscription. Examples of the subscription data 450 are shown in FIGS. 5A and 5B. In one example, the second module 440 extracts a tenant identifier and event type from the emitted event 430 and looks up subscriptions configured to receive data for the extracted tenant identifier and event type in the subscription data 450. For example, an emitted event 430 corresponds to an Incident Created domain event. The emitted event 430 includes an event type IncidentCreated and a tenant identifier identifying a particular PSAP, e.g., the PSAP of the telecommunicator who initiated the Incident Created event. The second module 440 compares this event type and tenant identifier to the subscription data 450 to identify subscriptions configured to receive this emitted event 430. For example, the second module 440 identifies three subscription queues, Subscription A queue 320a, Subscription B queue 320b, Subscription D queue 320d. The second module 440 adds the emitted event 430 to each of the identified subscription queues.

In some embodiments, the second module 440 further extracts an agency identifier identifying an agency associated with the emitted event 430 from the emitted event 430, and looks up subscriptions configured to receive data for the agency identifier. For example, the second module 440 extracts an agency identifier identifying a particular fire response agency dispatched by the tenant, and the second module 440 further compares this agency identifier to the subscription data 450 to identify subscriptions configured to receive emitted events with the agency identifier. For example, a subscription for a particular fire agency's station alerting system may be configured to receive emitted events with the agency identifier for the particular fire agency. In other embodiments, the subscription receives all emitted events for a tenant that includes the fire agency, and the distribution module 330 filters events relative to the particular agency.

In this example, the subscription queues 320 are arranged into subscribers 460. A first subscriber, Subscriber 1 460a, includes three Subscriptions Queues 320a-320c. A second and third subscriber, Subscriber 2 460b and Subscriber 3 460c, each have a single subscription, Subscription D Queue 320d and Subscription E Queue 320e. A subscriber 460 includes a collection of one or more related subscriptions. For example, Subscriber 1 460a represents a set of related RMS systems that receive event data for a particular PSAP. Continuing the example, the Subscription A Queue 320a is an RMS system associated with a first agency whose resources are dispatched by the PSAP (e.g., a first Fire/EMS agency), the Subscription B Queue 320b is an RMS system associated with a second agency whose resources are dispatched by the PSAP (e.g., a second Fire/EMS agency), and the Subscription C Queue 320c is an RMS system associated with a third agency whose resources are dispatched by the PSAP (e.g., a county sheriff). The RMS systems may be coordinated or co-managed, but they may have different subscription settings implemented by the distribution module 330. In addition, the different RMS systems may be configured to receive different events, as illustrated in FIG. 4, with emitted event 430 provided to queues 320a and 320b, but not 320c. In other embodiments, all subscription queues 320 that fall within a subscriber 460 may receive identical sets of events. In some embodiments, the subscribers 460 may be selectively enabled or disabled. For example, a subscriber 460 may be disabled during an initial configuration process, and enabled after configuration is complete. The subscriber structure makes it easier for an administrator at the emergency system 150 to work on a related set of subscriptions, particularly if a subscriber 460 includes many constituent subscriptions 320.

While FIG. 4 shows the event emitter 310 distributing the emitted event 430 directly to the subscription queues 320, in other embodiments, the event emitter 310 (e.g., the second module 440) identifies one or more subscribers 460 that configured to receive a particular emitted event, and the respective subscribers 460 append the emitted event to one or more of their subscription queues 320. In some embodiments, the subscription queues 320 may not be arranged into the subscribers 460, and each subscription queue 320 is independent from the other subscription queues.

Example Subscription Data

FIGS. 5A and 5B provide two illustrations of subscription data used by the data subscription system 270 according to some embodiments of the present disclosure. FIG. 5A shows subscription data arranged by subscription. In this example, each subscription has a corresponding list with one or more event types, tenants, and agencies the receiving system is configured to receive. This arrangement represents subscription data as it is input for each subscription, e.g., each receiving system indicates the event types, tenants, and agencies it receives for each of its subscriptions. In this example, the Agency A RMS and Agency B RMS subscriptions may correspond to Subscription A 320a and Subscription B 320b shown in FIG. 4, and the Agency A RMS and Agency B RMS are grouped at a single Subscriber (here, Subscriber 1 460a). The Agency A Fire Station Alerting System and Agency A Printer Server may be subscriptions grouped as separate subscribers, e.g., Subscriber 2 460b and Subscriber 3 460c, respectively.

FIG. 5B shows the subscription data of FIG. 5A that has been transformed to map event data (here, tenant, agency, and event type) to a set of subscriptions that receive events that match the event data. The data subscription system 270 may automatically transform the subscription data from the arrangement shown in FIG. 5A to the arrangement shown in FIG. 5B, e.g., when new subscription data is received or when subscription data is updated, or on a periodic basis. The second module 440 may use the data in the format shown in FIG. 5B as the subscription data 450 when finding subscriptions that match a particular emitted event 430. For example, if the first module 420 passes through, as the emitted event 430, a domain event 410 from tenant X that corresponds to an incident being handled by Agency 1 and having event type Unit Dispatched, the second module 440 determines to add this emitted event 430 to the subscription queues for the Agency A RMS, the Agency A Fire Station Alerting System, and the Agency A Print Server. The data fields (tenant, agency, and event type) shown in FIGS. 5A and 5B are merely examples, and in other embodiments, the event emitter 310 may use alternate, fewer, or additional data fields to assign events to subscriptions. Furthermore, in other embodiments, the second module 440 uses data arranged as shown in FIG. 5A or in another arrangement to find subscriptions for a given emitted event 430.

Example Distribution Module

Figure 6:
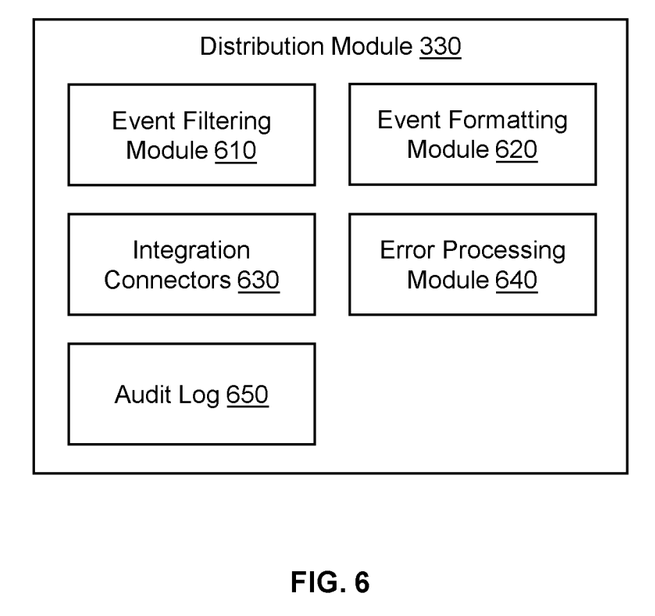
FIG. 6 is a block diagram of a distribution module for distributing events from the subscription queues to the receiving systems according to some embodiments of the present disclosure.

FIG. 6 is a block diagram of a distribution module 330 for distributing events from the subscription queues to the receiving systems 180 according to some embodiments of the present disclosure. The distribution module 330 includes an event filtering module 610, an event formatting module 620, integration connectors 630, an error processing module 640, and an audit log 650. In alternative configurations, different and/or additional components may be included in the distribution module 330. Additionally, functionality described in conjunction with one or more of the components shown in FIG. 6 may be distributed among the components in a different manner than described in conjunction with FIG. 6 in some embodiments.

The event filtering module 610 filters the event data for a given subscription. The event filtering module 610 may store subscription-specific filtering rules, e.g., filtering rules received from the configuration module 340 and set by the receiving system 180. The filtering rules may specify a specific set of data fields that the subscription receives. The filtering rules may include event-specific filtering rules, e.g., a first set of data fields to include for a first event type, a second set of data fields to include for a second event type, etc. In other embodiments, the filtering rules apply to multiple event types (e.g., event types with the same set of data fields) or all event types (e.g., for data fields included across all events). The event filtering module 610 filters event data in each subscription queue 320 according to the filtering rules. In some embodiments, the distribution module 330 implements an independent event filtering module 610 for each subscriber (if the same filtering rules apply to all subscriptions 320 within a subscriber 460) or for each subscription 320.

The event formatting module 620 reformats the event data in each subscription queue 320 to a format associated with the receiving system 180 of the subscription queue 320. The event formatting module 620 may reformat the event data after it has been filtered by the event filtering module 610, as described above. The event formatting module 620 may store subscription-specific formatting rules, e.g., formatting rules received from the configuration module 340 and set by the receiving system 180. The formatting rules may specify field-specific formatting rules, e.g., rules to format a phone number in a particular way (e.g., "(123)-456-7890" or "1234567890"), rules to format an address in a particular way (e.g., Address="123 MAIN STREET, CITY, STATE 12345" or Address="123 MAIN ST"; City="CITY"; State="ST"; ZIP="12345"), etc. The formatting rules may add line breaks, remove line breaks, split a data field into multiple data fields, combine data from multiple data fields into a single field, or perform other types of data transformations. In some embodiments, the formatting rules follow a particular standard, e.g., a standard format for call data or location data. In some examples, the formatting rules include rules for formatting data at a data message level. For example, a formatting rule may instruct the event formatting module 620 to combine data from multiple events into a single data message, or to split data from an event into multiple data messages. The event formatting module 620 reformats the data fields and/or the events in each subscription queue 320 according to the formatting rules. In some embodiments, the distribution module 330 implements an independent formatting module 620 for each subscriber (if the same formatting rules apply to all subscriptions 320 within a subscriber 460) or for each subscription 320.

The integration connectors 630 connect the event emitter 310 to the receiving systems 180. The integration connectors 630 may each include an outgoing message queue including the filtered and formatted event data. The distribution module 330 may include various types of integration connectors 630, and the integration connectors 630 may perform one or more functions specific to the receiving system 180 or subscription 320. For example, some integration connectors 630 may use hypertext transfer protocol (HTTP) callbacks or webhooks to emit data messages with event data to receiving systems 180. In this example, the integration connector 630 or formatting module 620 may format each data message for a given subscription as an HTTP POST that includes a header and a payload. As another example, some integration connectors 630 may use secure file transfer protocol (SFTP) to emit data messages with event data to receiving system 180. In this example, the integration connector 630 or formatting module 620 may format each data message for a given subscription as extensible markup language (XML) files, with each XML file having a unique name to avoid data messages being overwritten. In other embodiments, additional or alternative protocols and message formats may be used.

The error processing module 640 detects and responds to errors in the data subscription system 270. The integration connectors 630 may receive messages from the receiving systems 180 indicating the presence of an error. For example, an integration connector 630 that uses HTTP callbacks receives acknowledgments from the receiving system 180, e.g., the integration connector 630 expects a response with an HTTP Status code of 200 (OK) in response to each data message sent from the integration connector 630. If the integration connector 630 receives another type of response, e.g., an error message, from the receiving system 180, the integration connector 630 passes the response to the error processing module 640. Further, if the integration connector 630 does not receive any response from the receiving system 180 in response to a data message, the integration connector 630 alerts the error processing module 640. Different integration connectors 630 may receive different types of responses from the receiving systems 180 depending on the messaging protocol used.

In response to an error message or alert from an integration connector 630, the error processing module 640 may re-queue the data message to be sent, either on the subscription queue 320 or an outgoing message queue included in the integration connector 630 or elsewhere within the distribution module 330. Alternatively, the error processing module 640 instructs the distribution module 330 to skip over the data message and move onto the next data message in the subscription queue 320, e.g., if the error was in the data message itself. The error processing module 640 may examine the contents of the error message or alert and/or the data message to identify a cause of the error and response appropriately. If a particular data message cannot be sent or resent successfully, or if the integration connector 630 cannot send messages to a receiving system 180, the error processing module 640 raises an alert to an administrator at the emergency system 150 and/or the receiving system 180.

The audit log 650 stores metadata describing the transmission of data messages from the data subscription system 270 to the receiving systems 180. The audit log 650 may store data for a particular period of time, e.g., one month or six months. The audit log 650 may store data for a length of time requested by a particular receiving system 180. The audit log 650 may store data describing any errors encountered in the processing and transmission of events to receiving system 180. The audit log 650 may store data in an encrypted format. Alternatively or additionally, the audit log 650 may store data that describes the transmission of event data to receiving systems 180 but removes any personally identifying information included in the event data.

Example Process for Distributing Events to Receiving Systems

Figure 7:
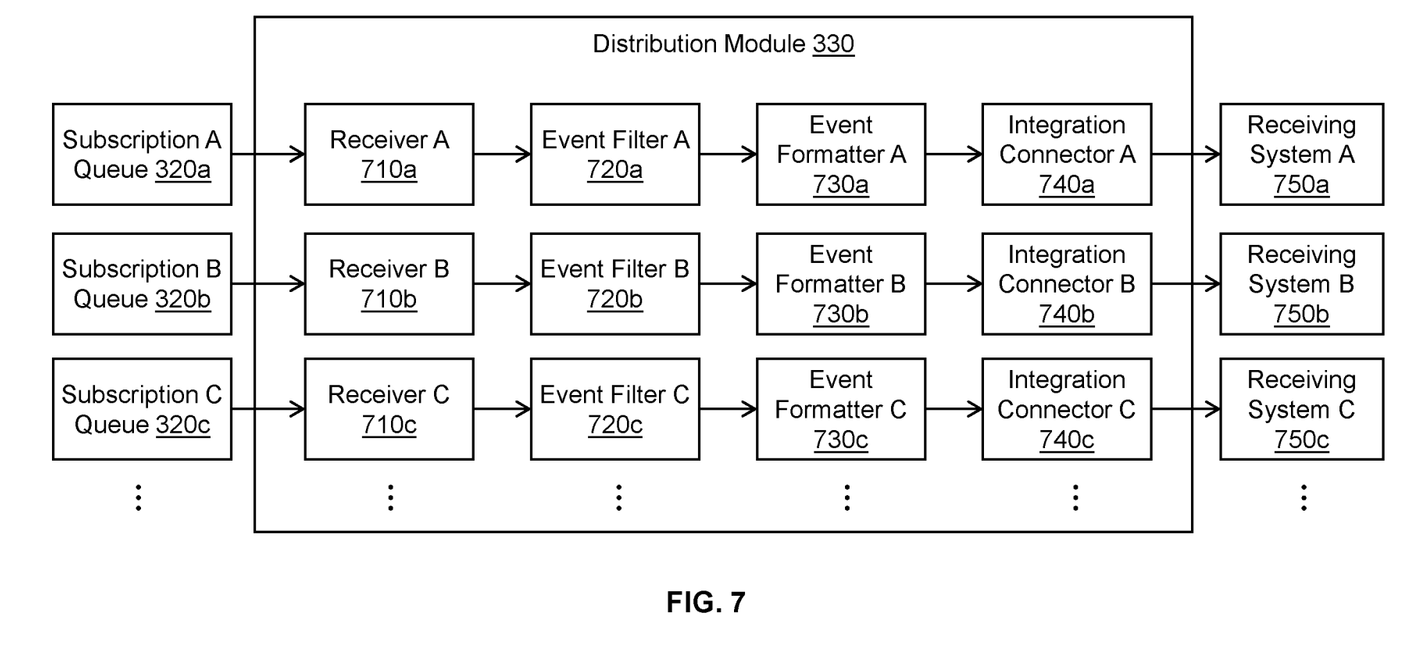
FIG. 7 is a flow diagram illustrating the distribution of events from the subscription queues to the receiving systems according to some embodiments of the present disclosure.

FIG. 7 is a flow diagram illustrating the distribution of events from the subscription queues to the receiving systems according to some embodiments of the present disclosure. In this example, the distribution module 330 includes an independent channel for processing and distributing data messages from each subscription queue 320. For example, the distribution module 330 includes a Receiver A 710a that receives event data from the Subscription A queue 320a. Receiver A 710a passes the event data to Event Filter A 720a, which is an instance or sub-module of the event filtering module 610 described with respect to FIG. 6. Event Filter A 720a uses filtering rules specific to the subscription received by Receiving System A 750a. Event Formatter A 730a is an instance or sub-module of the event formatting module 620 described with respect to FIG. 6. Event Formatter A 730a receives the filtered data from Event Filter A 720a and formats the filtered data according to formatting rules specific to the subscription received by Receiving System A 750a. Integration Connector A 740a is an example of the integration connectors 630 described with respect to FIG. 6. Integration Connector 740a receives the formatted data from Event Formatter A 730a and distributes the formatted data to Receiving System A 750a. Note that a particular receiving system (e.g., Receiving System A 750a) may receive multiple subscriptions, and each subscription may include a respective channel, with independent filtering rules, formatting rules, and integration connector.

Other Implementation Notes, Variations, and Applications

It is to be understood that not necessarily all objects or advantages may be achieved in accordance with any particular embodiment described herein. Thus, for example, those skilled in the art will recognize that certain embodiments may be configured to operate in a manner that achieves or optimizes one advantage or group of advantages as taught herein without necessarily achieving other objects or advantages as may be taught or suggested herein.

It should be appreciated that the electrical circuits of the accompanying drawings and its teachings are readily scalable and can accommodate a large number of components, as well as more complicated/sophisticated arrangements and configurations. Accordingly, the examples provided should not limit the scope or inhibit the broad teachings of the electrical circuits as potentially applied to a myriad of other architectures.

Numerous other changes, substitutions, variations, alterations, and modifications may be ascertained to one skilled in the art and it is intended that the present disclosure encompass all such changes, substitutions, variations, alterations, and modifications as falling within the scope of the appended claims. Note that all optional features of any of the devices and systems described herein may also be implemented with respect to the methods or processes described herein and specifics in the examples may be used anywhere in one or more embodiments.

What is claimed is:

1. A method for providing emergency data to receiving systems comprising:
   receiving, from a computer-aided dispatch (CAD) service, domain event data describing a domain event related to an emergency call, the domain event data comprising an event type and a tenant identifier, the tenant identifier identifying a tenant associated with the domain event;
   identifying a subscription queue subscribed to the domain event data based on the event type and the tenant identifier, the subscription queue associated with a receiving system;
   adding a data message comprising at least a subset of the domain event data to the subscription queue;
   transforming the data message based on a formatting rule to format the data message in a particular format associated with the receiving system; and
   transmitting the transformed data message to the receiving system, the receiving system comprising a database of domain event data related to emergency calls.

2. The method of claim 1, further comprising receiving an input from a user of the CAD service and generating the domain event in response to the input.

3. The method of claim 1, wherein the domain event data is received at a call data ingestion module, the call data ingestion module to receive call data related to calls received at a public safety answering point (PSAP).

4. The method of claim 1, further comprising storing subscription data relating each of a plurality of receiving systems to at least one tenant and at least one event type, and identifying the subscription queue associated with the receiving system based on the stored subscription data.

5. The method of claim 1, wherein the event type of the domain event is one of a plurality of event types, a first event type of the plurality of event types associated with a first set of domain event data, and a second event type of the plurality of event types associated with a second set of domain event data.

6. The method of claim 1, wherein the data message comprises a plurality of data fields, the method further comprising filtering a portion of the data fields of the data message according to a filtering rule.

7. The method of claim 6, wherein the filtering rule is an event-specific filtering rule for filtering the portion of the data fields based on the event type.

8. The method of claim 1, wherein the receiving system is a records management system for storing data from emergency calls.

9. The method of claim 1, wherein the receiving system is an emergency monitoring system that provides one or more user interfaces describing emergencies in a region.

10. The method of claim 1, wherein the receiving system is a station alerting system.

11. A system comprising:
    a memory configured to store subscription data describing domain event data provided to each of a plurality of receiving systems; and
    processing circuitry configured to:
        receive, from a computer-aided dispatch (CAD) service, domain event data describing a domain event related to an emergency call, the domain event data comprising an event type and a tenant identifier, the tenant identifier identifying a tenant associated with the domain event;
        compare the event type and the tenant identifier to the subscription data to identify a subscription subscribed to the domain event data, the subscription associated with a receiving system;
        transform the domain event data based on a formatting rule to format the domain event data in a particular format associated with the receiving system; and
        transmit the transformed domain event data to the receiving system, the receiving system comprising a database of domain event data related to emergency calls.

12. The system of claim 11, wherein the CAD service generates domain events in response to user input provided by a user of the CAD service.

13. The system of claim 11, wherein the domain event data comprises data received from a call data ingestion module, the call data ingestion module to receive call data related to calls received at a public safety answering point (PSAP).

14. The system of claim 11, wherein the subscription data relates each of the plurality of receiving systems to at least one tenant and at least one event type.

15. The system of claim 11, wherein the event type of the domain event is one of a plurality of event types, a first event type of the plurality of event types associated with a first set of domain event data, and a second event type of the plurality of event types associated with a second set of domain event data.

16. The system of claim 11, wherein the domain event data comprises a plurality of data fields, the processing circuitry is further configured to filter a portion of the data fields of the domain event data.

17. The system of claim 16, wherein the processing circuitry implements at least one event-specific filtering rule for filtering the portion of the data fields based on the event type.

18. The system of claim 11, wherein the receiving system is a records management system for storing data from emergency calls.

19. The system of claim 11, wherein the receiving system is an emergency monitoring system that provides one or more user interfaces describing emergencies in a region.

20. The system of claim 11, wherein the receiving system is a station alerting system.

* * * * *